United States Patent [19]

Smith

[11] 4,372,278

[45] Feb. 8, 1983

[54] HIGH TEMPERATURE AND HIGH PRESSURE FUEL INJECTION APPARATUS FOR INTERNAL COMBUSTION ENGINES

[76] Inventor: Rodney D. Smith, 6550 N. 2nd Dr., Phoenix, Ariz. 85013

[21] Appl. No.: 199,089

[22] Filed: Oct. 20, 1980

[51] Int. Cl.³ .............................................. F02M 31/00
[52] U.S. Cl. .................................... 123/557; 123/478
[58] Field of Search ........................ 123/478, 557, 558

[56] References Cited

U.S. PATENT DOCUMENTS 3,587,535  6/1971  Kimberley ........................... 123/490
3,812,830  5/1974  Traisnel ............................... 123/491
4,083,340  4/1978  Furr et al. ............................ 123/558

Primary Examiner—Tony M. Argenbright
Attorney, Agent, or Firm—H. Gordon Shields

[57] ABSTRACT

Fuel injection apparatus for internal combustion engine includes a fuel pump for pressurizing the fuel and a heat exchanger for increasing the temperature of the fuel to provide a substantially high temperature and high pressure fuel injected into each cylinder in response to predetermined engine parameters sensed by a plurality of sensors.

9 Claims, 2 Drawing Figures

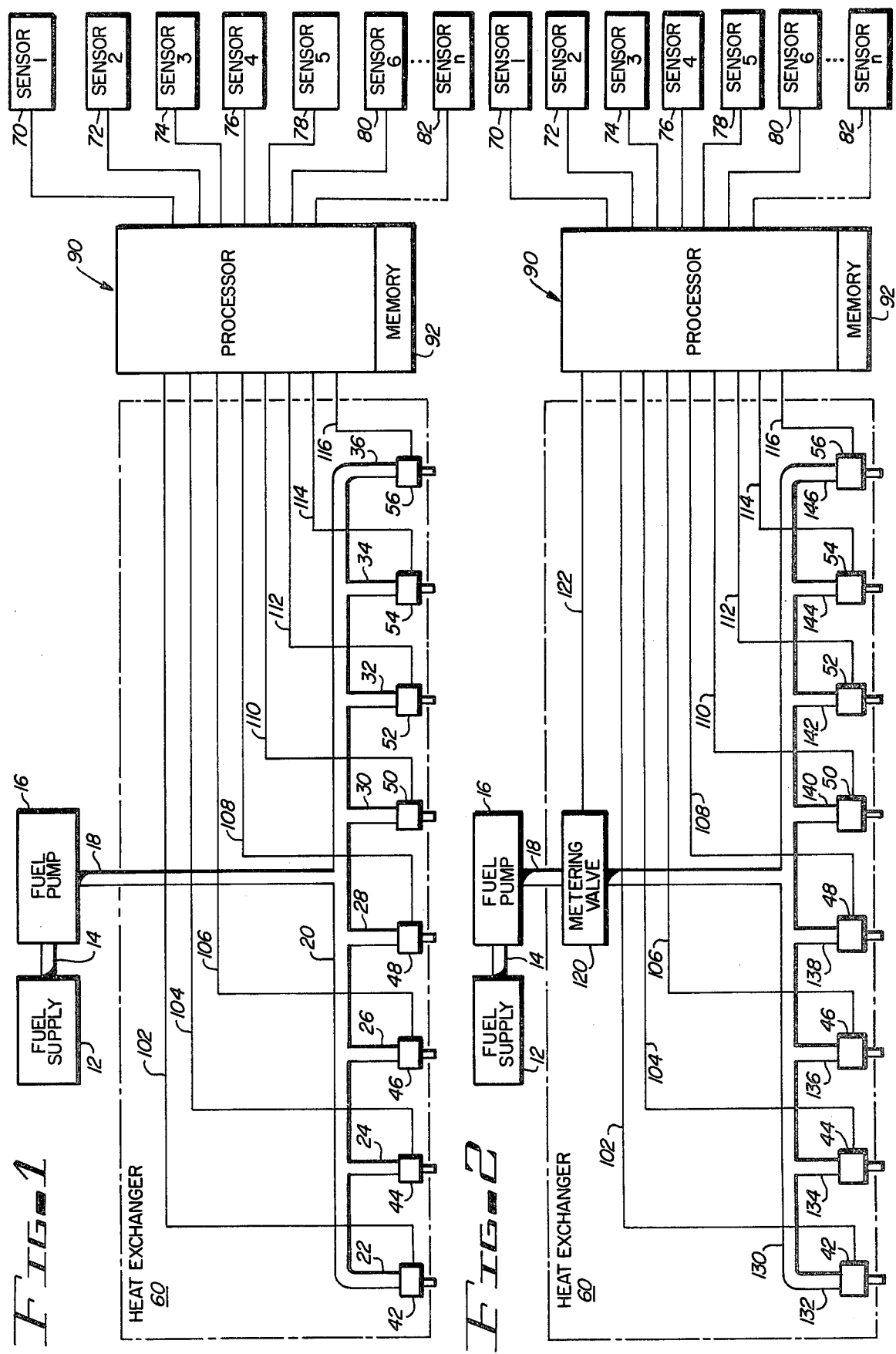

HIGH TEMPERATURE AND HIGH PRESSURE FUEL INJECTION APPARATUS FOR INTERNAL COMBUSTION ENGINES

BACKGROUND OF THE INVENTION

1. Field of the Invention

This invention relates to fuel injection apparatus and, more particularly, to fuel injection apparatus for internal combustion engines in which the fuel is pressurized and heated to pressures and temperatures substantially higher than prior art systems and the pressurized and heated fuel is injected into each cylinder in response to predetermined parameters.

2. Background of the Invention

U.S. Pat. No. 2,881,828 discloses a fuel injection system for a diesel engine in which the temperature of the fuel to the injectors is controlled thermostatically. The temperature of the fuel is correlated between the temperature of the fuel in the supply line and in the return line to maintain the temperature within predetermined limits. Excess heat from the fuel return line is exchanged with the fuel in the supply line by an appropriate heat exchanger, or in a second embodiment, the fuel from the return line is introduced directly into the supply line. In the patent, a desired temperature range for the supply fuel is between 150° and 250° F.

U.S. Pat. No. 3,738,334 discloses a pre-heater for heating fuel prior to the carburetor. Heat from the engine exhaust gases is used for pre-heating the fuel.

U.S. Pat. No. 3,762,378 discloses a fuel injection system in which fuel is injected directly into an engine cylinder, and the fuel is preheated prior to the injector. The fuel line includes a spiral coil disposed in an exhaust passage, and the flow of hot exhaust gases around the coil causes the temperature of the fuel to raise.

U.S. Pat. No. 3,827,409 discloses a fuel injection system in which fuel pressure is varied in response to engine speed or air mass flow. The speed of the engine is sensed, and the pressure of the fuel in an injector manifold or feed rail is varied in response to predetermined parameters based on engine speed or on air mass flow to the engine.

U.S. Pat. No. 3,933,135 discloses a fuel injection system in which fuel is injected into an intake manifold in accordance with predetermined parameters based on air mass flow which is electronically sensed. An electronic system, sensitive to air temperature, humidity, atmospheric pressure, as well as to mass air flow, is used to vary the amount of fuel injected into the manifold.

U.S. Pat. No. 4,040,394 discloses a fuel injection system in which an exhaust gas analyzer is used to provide data to control the supply of fuel to the injectors. A predetermined ratio of fuel and air is supplied to the engine to provide exhaust gases of a predetermined composition.

U.S. Pat. No. 4,051,817 discloses a fuel injection system in which a plurality of sensors are used to provide input to a control system which in turn controls the output of fuel injectors.

U.S. Pat. No. 4,082,066 discloses a fuel injection system which utilizes an electromagnetically actuated injector. A plurality of sensors are used to sense a plurality of engine conditions, and the output from the sensors is transmitted to a post generator, which generates a variable width pulse in response to the input from the engine sensors. The variable width pulse determines the time in which the injectors are open in order to provide the correct amount of fuel flow. A constant pressure fuel source is provided to the injectors and accordingly the flow of fuel from the injectors is in direct proportion to the length of time that the injector valve is open.

U.S. Pat. No. 4,094,275 discloses a fuel system which includes a primary and secondary heating system for vaporizing fuel using exhaust gases. Fuel from the fuel tank is heated prior to the carburetor. A vapor reservoir stores the vaporized fuel under vapor pressure pressurization. The vapor reservoir includes a line for allowing condensed fuel to return to the fuel tank.

U.S. Pat. No. 4,099,499 discloses a heat exchanger usable with the apparatus of the '275 patent.

U.S. Pat. No. 4,109,669 discloses an electronic fuel injection system utilizing a variable injection pressure. Control circuitry for the apparatus is set forth in detail. As is typical in fuel injection systems, fuel is injected into a manifold from a plurality of injectors, and the manifold is in turn connected to a plurality of cylinders. The injectors are typically open to allow for fuel to be injected into the manifold during the exhaust cycle of an engine, and thus while the intake valves are closed. There are a few embodiments of fuel injection systems, such as the '378 patent discussed above, in which fuel is injected directly into a cylinder rather than into a manifold. The '378 apparatus causes the fuel to be ignited spontaneously, such as in a diesel system, as opposed to a typical four stroke cycle gasoline internal combustion engine in which spark plugs are used. In such hypergolic systems, as the '378 patent discusses, the compression of the fuel and air is rather high, and such high compression causes the temperature of the compressed gases to be high enough so that the spontaneous ignition occurs when the fuel is injected into the cylinder.

In the above described patents, various types of systems are used for providing fuel, either through fuel injection or through carburetion, to the various types of internal combustion engines disclosed. In several of the patents, heat exchangers are used to increase the temperature of the fuel prior to the injection or to carburetion, whichever is used. Variable fuel pressure is also suggested in several of the patents as part of a fuel metering system. Also, several of the patents discuss the vaporization of fuel, but none of the patents discuss or disclose systems in which fuel is vaporized by a combination of high pressure and high temperature of the fuel itself.

Some of the patents mentioned above discuss fuel vaporization, but the term "atomization" should preferably be used instead of "vaporization". Partial vaporization may take place, but not substantially complete vaporization. The "vaporization" of the prior art patents appears to be atomization, in which liquid fuel droplets break down into fine liquid particles which move in or with a moving air mass. The vaporization of fuel is the gaseous state of liquid fuel which results from a combination of temperature and pressure, as produced by the present invention.

SUMMARY OF THE INVENTION

The apparatus of the present invention comprises a combination of high temperature and high pressure to vaporize fuel substantially completely and the vaporized fuel is injected into individual cylinders.

Among the objects of the invention are the following:

To provide new and useful fuel injection apparatus for an internal combustion engine;

To provide new and useful fuel injection apparatus utilizing fuel at relatively high pressures;

To provide new and useful fuel injection apparatus in which the fuel is heated to a relatively high temperature;

To provide new and useful fuel injection apparatus utilizing individual cylinder injection;

To provide new and useful fuel injection apparatus in which a plurality of sensors are used to sense engine conditions for determining fuel quantities to be injected into the engine; and To provide new and useful fuel injection apparatus in which fuel is injected into engine cylinders while the cylinder intake valves are open.

BRIEF DESCRIPTION OF THE DRAWING

FIG. 1 comprises a schematic diagram of the fuel injection apparatus of the present invention.

FIG. 2 is a schematic diagram of an alternate embodiment of the fuel injection apparatus of FIG. 1.

DESCRIPTION OF THE PREFERRED EMBODIMENT

FIG. 1 is a schematic diagram of a fuel injection apparatus 10 for an internal combustion engine, typically a spark ignition, four stroke cycle engine. Various components of internal combustion engines are known and understood, and are accordingly not illustrated herein, such as individual cylinders, spark plugs, a distributor or other type of electronic ignition system utilized for sequentially firing spark plugs, and the like. Rather, only the elements necessary to explain the apparatus of the present invention are shown in FIG. 1 (and also in FIG. 2).

A fuel supply 12, which may be an ordinary gas tank, is connected by a conduit 14 to a fuel pump 16. The fuel pump 16 may be an engine driven pump, capable of providing an output pressure of up to about 450 p.s.i. or to the final vapor point of whatever fuel is being used, which may be higher or lower than the 450 p.s.i. previously stated. The stated pressure of 450 p.s.i. is applicable to gasoline in contemporary use. However, other fuels may require other pressures.

Fuel flows from the fuel pump 16, at such relatively high pressure, through a conduit 18 to a fuel distribution manifold 20. Connected to the distribution manifold 20 are a plurality of fuel lines or runners which extend from the manifold 20 to a plurality of injectors. The manifold lines or runners are identified by reference numerals 22, 24, 26, 28, 30, 32, 34, and 36. Each line or runner 22 . . . 36 extends to a fuel injector, and the injectors are respectively identified by reference numerals 42, 44, 46, 48, 50, 52, 54, and 56. For purposes of illustration herein, the internal combustion engine to which the fuel injection apparatus 10 is secured is an eight cylinder vehicle, such as an automobile or truck. Accordingly, either fuel injectors 42 . . . 56 are shown, respectively secured to the distal end of the manifold runners 22 . . . 36, remote from the fuel manifold 20.

It will be noted that the fuel between the fuel pump and the fuel injectors, including the fuel in the fuel line 18, the fuel manifold 20, and the individual manifold tubes or runners 22 . . . 36 is under the substantially constant, relatively high pressure. The relatively high fuel pressure, as discussed above, is maintained by the fuel pump 16.

Between the fuel pump 16 and the injectors 42 . . . 56, and particularly associated with the fuel line or conduit 18, and the manifold 20, there is shown in FIG. 1 a heat exchanger 60. The heat exchanger 60 utilizes heat produced by the engine to which the apparatus 10 is secured for the purpose of heating the fuel to a temperature of up to about 450° F. The actual temperature of the fuel may vary over a range of temperatures, the range of which is determined by the vapor point or vapor temperature of the particular fuel being used. It is desired to have the fuel at the vapor point, with respect to its temperature and pressure, as the fuel is injected by an injector into each cylinder, individually, or into individual tubes or manifold runners which extend to each cylinder. A dotted line extends from the heat exchanger 60 to encompass the fuel delivery manifold 20, the individual fuel runners or tubes 22 . . . 36, and the nozzles 42 . . . 56. The heat exchanger may be designed to provide heat over a greater area than merely the conduit 18. The basic idea is to heat the fuel and to maintain the fuel at a relatively high temperature, as well as at a relatively high pressure, until it (the fuel) is injected by the injectors.

The pressure of the fuel is high enough to prevent the fuel from vaporizing at any given temperature, plus a safety factor above the particular pressure required to prevent the vaporization of the fuel prior to injection. For example, if a particular fuel requires a pressure of about 450 p.s.i. to prevent vaporization at a temperature of 450° F., then a cushion or safety factor of about 150 p.s.i. is preferably provided on top of, or in addition to, the 450 p.s.i. required to prevent vaporization at the 450° temperature. The pressure of the fuel between the fuel pump 16 and the injectors 42 . . . 56 is accordingly kept at about 600 p.s.i.

The desired fuel temperature and pressure are maintained at the nozzles so that the fuel is at the vapor point when the injector opens and the fuel is then substantially completely vaporized as it is injected into a cylinder, or into a manifold runner or fuel delivery tube adjacent a cylinder, as desired.

The nozzles 42 . . . 56 and the fuel delivery tubes or conduits 132 . . . 146 extend to each cylinder, or into an intake manifold runner adjacent each cylinder. If the nozzles extend into intake manifold runners, it is preferable to have the injectors as close to the intake valves of the cylinders as is practical. The reason for this is to prevent or to minimize fuel wetting which may occur if the injector nozzle is located remotely from the intake cylinder, and if the desired relatively high temperature of the fuel is not maintained. If the temperature of the intake manifold runner into which the injector extends, and into which the fuel is injected, falls below a predetermined minimum, the substantially completely vaporized fuel may condense to a liquid state from its gaseous state as it contacts the "cooled" walls of the manifold. Accordingly, this situation is to be avoided if at all possible in order to maximize the efficiency of the fuel, which is of primary importance with the apparatus of the present invention.

While the heat exchanger 60 is shown in FIG. 1 as being primarily associated with the fuel line 18, which extends between the fuel pump 16 and the manifold 20, the heat exchanger 60 may also encompass the manifold 20, and the manifold runners or fuel delivery tubes 22 . . . 36. As discussed above, this is indicated in FIG. 1 by the dotted line extending outwardly from the heat exchanger 60. Obviously, the relative distances, sizes, etc., are not shown in FIGS. 1 and 2 since they are only schematic representations. Accordingly, the actual size of the various components, and their specific relationships to each other, is not shown in FIGS. 1 and 2.

As has been stated above, the fuel delivery tubes or conduits 22 ... 36 extend from the manifold 20 in line 18 directly to the individual cylinders of the engine to which the apparatus 10 is secured, terminating at an injector 42 ... 56 at each cylinder. In the alternative, an injector is located in each intake manifold runner located adjacent each cylinder. There is a one-for-one relationship between the cylinders of the engine and the fuel injectors, with a single injector injecting fuel for a particular cylinder, either directly into a cylinder, or into an individual manifold runner adjacent the individual cylinder.

The nozzles 42 ... 56 are opened while the appropriate intake valves are opened so as to provide a direct flow of vaporized fuel into the intake cylinders through the opened intake valves. Depending on the fuel requirements, an injector may be opened during the entire period of time that an intake valve is opened, or an injector may be opened for only a portion of the time that an intake valve is opened. Thus, for example, if the fuel requirements are relatively low, an injector may be opened for less time than a corresponding intake valve may be opened. If, on the other hand, a substantial amount of fuel is required, then an injector may be opened for substantially the entire length of time that its associated intake valve is opened. There will thus be a direct flow of fuel from an injector into its cylinder.

The requirements of the engine under various conditions will determine the amount of fuel flowing into the engine. This is controlled by the length of time that each of the injectors 42 ... 56 is open to allow the pressurized and heated fuel from the fuel delivery tubes or conduits to flow through the injectors. As shown in FIG. 1, each injector includes a conductor extending to the respective injectors from a computer processor 90. The processor 90 controls, electronically, the length of time that each injector is open for the metering of the fuel to each cylinder. The processor 90 may be a small, mini-computer which includes a read-only memory (ROM) 92 connected thereto. The memory 92 has preprogrammed into it the various instructions and data concerning the operation of the fuel injection apparatus 10 under a wide variety of conditions. The conditions are in turn sensed by a plurality of sensors 70, 72, 74, 76, 78, 80, and 82. The sensors are schematically shown in FIG. 1. They comprise the input elements for the processor 90. While only seven sensors 70 ... 82 are shown in FIG. 1, it is obvious that any number of sensors may be utilized by the apparatus of the present invention, limited only by the practicality of the apparatus with respect to the information which a sensor may derive and may transmit to the processor.

In most cases, the sensors may simply be transducers of various types which are located in various areas or portions of the engine to sense certain information from the engine and transmit that information to the processor. The information in turn is processed, compared with the information in the memory 92. On the basis of the correlation of the data from all of the sensors, signals are transmitted from the processor 90 to the injectors 42 ... 56, through the conductors 102 ... 116 for fuel metering.

For illustrative purposes herein, only seven sensors are specifically identified and correlated with the processor 90 and the apparatus 10. Other sensors will be discussed in general terms.

Sensor 70 comprises a manifold pressure (or manifold vacuum) sensor. It is a transducer which monitors the pressure or vacuum in the intake manifold. The manifold pressure or vacuum is an indication of, among other things, the load imposed on the engine. The sensing of low vacuum indicates that the engine is under a relatively heavy load and accordingly additional fuel may be required.

Sensor 72 senses air temperature and provides the information to the computer 90.

Sensor 74 provides exhaust temperature information to the computer 90.

Sensor 76 monitors the temperature of the fuel in the general area of the heat exchanger 90. That is, the sensor 76 provides the computer processor 90 with information pertaining to the temperature of the heated fuel.

Sensor 78 monitors the pressure of the fuel downstream from the fuel pump 16. This fuel pressure information may be sensed between the fuel pump 16 and the injectors 42 ... 56, but preferably in the fuel line or conduit 18.

Engine speed (R.P.M.) is sensed by sensor 80. The engine speed information is required for several different purposes, such as for determining air flow, for timing the fuel injectors, and for firing of the spark plugs. This may be magnetically or inductively sensed from the harmonic balance at the front of the engine. Obviously, other methods of sensing engine speed may also be used.

Finally, sensor 82 is a cam shaft sensor for determining what part of a cycle the engine, or a key or index cylinder, is in at any time. This may be determined from the distributor shaft, fuel pump shaft, or the like. Since there is a known relationship between each cylinder in an engine, from knowing where in a cycle any one cylinder is, the location of any other cylinder may be determined.

In addition to the seven sensors specifically discussed above, several other sensors may be desirable. Among such desirable sensors are a barometric pressure sensor for sensing ambient air pressure and a hygrometer for sensing the humidity of the air. The latter is important since the amount of moisture in the air aspirated by the engine affects the burning rate of the fuel, among other things.

From what has been stated above, it is obvious that the computer 90 must know when each intake valve opens and closes. This information is derived from the crankshaft sensor 82 and the R.P.M. sensor 80. As a practical matter, the information concerning the intake valve opening and closing may be derived from knowing the location of the cam shaft, or of a particular lobe on the cam shaft, for example the lobe on the cam shaft which opens and closes the intake valve. From knowing the position of the particular or key lobe on the cam shaft, such as the intake valve lobe for the number one cylinder, and then knowing the degrees of rotation of the cam shaft between the intake valve lobe for the first cylinder and for each successive cylinder in order, it is then possible to determine when the intake valve for any particular cylinder opens. Knowing also the angular relationship between the opening of the intake valve and the closing of it, it is also then possible to determine when each intake valve closes.

Air density may be determined from an air flow sensor (not shown) and from the manifold vacuum sensor 70. In conjunction with a barometric pressure sensor, mixture and timing information may be determined for optimum conditions. Moreover, compensation may be made for altitude changes.

The operating temperature of the engine, or more accurately the temperature of the engine coolant, is normally sensed in virtually all vehicle engines. Such a sensor is well known and understood. A cool or cold engine generally requires a higher idle speed and a greater ignition advance than a warm engine.

The position of the throttle is a factor affecting both mixture and timing. Accordingly, a sensor may be provided for providing throttle position information to the computer 90.

To provide an indication of the air-fuel mixture flowing into the cylinders, a sensor may be provided to measure the quantity of oxygen in the engine exhaust gases.

There are other types of information that may be provided to the processor 90 to further refine the fuel metering and the timing of the fuel injectors and also the timing of the spark plugs on an engine. The seven sensors illustrated provide probably a minimum amount of information, while the additional sensors discussed provide probably an optimum amount of information, for enabling the apparatus to provide the most nearly, or substantially, correct amount of fuel for any given air flow under a wide range of operating conditions of an engine.

An additional sensor, not shown, which may be included with the apparatus of the present invention for convenience, is a fuel flow sensor. By correlating fuel flow information with distance and speed information, and even time information, the processor 90 may provide a variety of readout information to the vehicle driver for optimizing driving efficiency, and the like.

FIG. 2 comprises a schematic diagram of an alternate embodiment of the apparatus of FIG. 1. The same basic elements shown in FIG. 1 are also provided in the apparatus of FIG. 2, including fuel supply 12 connected to a fuel pump 16 by a fuel line or conduit 14. From the fuel pump 16, a pressurized fuel line or conduit 18 extends to a fuel metering valve 120. The metering valve 120 is in turn connected to a fuel manifold 130. A plurality of fuel delivery tubes or conduits 132 . . . 146 are connected to the manifold 130. As shown, there are eight fuel delivery tubes or conduits 132, 134, 136, 138, 140, 142, 144, and 146 which extend between the manifold 130 and eight fuel injectors, respectively injectors 42, 44, 46, 48, 50, 52, 54, and 56.

A connector 122 extends from the computer processor 90 to the metering valve 120. In the embodiment of FIG. 2, the metering valve 120 controls the flow of fuel from the fuel pump 16, and the fuel line or conduit 18, into the fuel supply manifold 130. The metering valve 120 is in turn controlled by the processor 90. The metering valve 120 receives the heated and pressurized fuel from the fuel line 18 and opens in response to the fuel demands of the engine, as monitored by the plurality of sensors 70 . . . 82 and correlated by the computer 90. The metering valve 120 opens and the heated and pressurized fuel vaporizes as it flows through the metering valve 120 into the manifold 130. From the manifold 130, the vaporized fuel flows through the fuel delivery tubes 132 . . . 146 to the injectors 42 . . . 56 connected respectively to the delivery tubes or conduits 132 . . . 146.

The fuel injectors 42 . . . 56 are connected also to the processor by their respective conductors 102 . . . 116.

However, the conductors 102 . . . 116 no longer include the function of timing the opening and closing of the injectors for providing a metered quantity of fuel through the injectors. Rather, the injectors 42 . . . 56 are now preferably open all during the opening of the intake valve for each cylinder. Thus, timing information is still provided by the processor to the fuel injectors to the respective conductors, but the timing information is for the purpose of holding the injectors open during the open time of each cylinder intake valve so that the vaporized fuel, premetered by the metering valve 120, flows into the respective cylinders from the manifold 130 and from the respective fuel delivery tubes extending from the manifold 130 to the injectors.

As discussed above in conjunction with FIG. 1, and as illustrated in FIG. 2 by a dotted line extending from the heat exchanger 60, and including the fuel delivery tubes or conduits 132 . . . 146, the heat from the engine, through the heat exchanger 60, is provided to both the fuel delivery manifold 130 and its respective fuel delivery tubes 132 . . . 146. This is done in order to provide sufficient heat to keep the fuel flowing from the metering valve 120, through the manifold 130 and the individual delivery tubes 132 . . . 146 in a vaporized state for ultimate delivery to the cylinders, still as a vapor, for maximum efficiency.

By providing a substantially correct amount of substantially vaporized fuel into individual cylinders, the apparatus of the present invention substantially reduces the nitrous oxides emanating from an engine in the exhaust gases. Moreover, lower combustion temperatures are provided because the amount of fuel is substantially chemically correct over the wide range of operating temperatures, pressures, and other fuel parameters, as discussed above. No excess fuel is provided into cylinders, which excess fuel results in excessive combustion temperatures, because the computer 90 is pre-programmed to provide the correct amount of fuel over the wide range of operating parameters.

As is understood, in internal combustion engines of the prior art, the fuel is combusted over a period of time during the down stroke of the piston in the cylinder. A substantial amount of this burning is not utilized as energy acting through the piston and transmitted to the crankshaft, but is waste energy, transmitted from the cylinders in the form of heat to be removed by the cooling system of an engine. In the apparatus of the present invention, the combustion temperatures in the cylinders are substantially lowered because the fuel is combusted initially, since the air/fuel mixture is a chemically correct mixture and since the fuel is in the form of a vapor instead of raw or liquid fuel, e.g., gasoline. The liquid gasoline must be vaporized prior to burning, and thus burns over a period of time during the downstroke of the engine, if it is not vaporized initially.

Because of the substantially complete combustion of the vaporized fuel in each cylinder, there is a reduced amount of unburned hydrocarbons and carbon monoxide resulting from the employment of the present invention. The unburned hydrocarbons and carbon monoxide which are produced by prior art internal combustion engines is the primary form of air pollution, together with the nitrous oxides or nitrogen compounds discussed above. Thus, the engine employing the apparatus of the present invention substantially reduces air pollution.

From the above statements it may be deduced, as has been stated, that the apparatus of the present invention provides a chemically correct amount of fuel for the amount of air, or a chemically correct air/fuel ratio, under a wide variety of operating conditions or parameters of an internal combustion engine. The overall economy of an engine is improved, and the resulting pollution from an engine is substantially reduced.

What is claimed is:

1. Fuel injection apparatus in an internal combustion engine, comprising, in combination:
   cylinder means in which fuel is combusted;
   a supply of fuel;
   manifold means for distributing fuel from the supply of fuel to the cylinder means;
   pump means for pressurizing fuel in the manifold means to a pressure of between about 450 psi and about 600 psi to prevent the fuel from vaporizing;
   heat exchanger means for heating the pressurized fuel to its vapor point and for maintaining the temperature of the fuel at its vapor point until injected into the cylinder means;
   fuel injection means connected to the manifold means and to the cylinder means for receiving the heated and pressurized fuel, and including valve means opening in response to a signal for allowing the heated and pressurized fuel to flow out of the injector means and into the cylinder means in the form of vapor as the result of the pressure and temperature of the fuel;
   signal means for providing a signal to the valve means for opening the valve means to meter a flow of heated and pressurized fuel;
   a plurality of sensors connected to the engine for monitoring a plurality of engine functions for providing information to the signal means; and
   a plurality of predetermined parameters for comparing with the information provided by the plurality of sensors and connected to the signal means for determining the length of time of opening of the valve means and providing the signal to the valve means in accordance with the determined length of time.

2. The apparatus of claim 1 in which the pump means includes a fuel pump connected to the supply of fuel and manifold means connected to the fuel injector means, and the heated exchanger means is connected to the manifold means for heating the pressurized fuel from the fuel pump.

3. The apparatus of claim 2 in which the manifold means is connected to the fuel injector means for providing pressurized and heated fuel to the fuel injector means.

4. The apparatus of claim 3 in which the manifold means includes a manifold runner extending to each cylinder of the cylinder means, and the fuel injector means includes a fuel injector connected to each manifold runner.

5. The apparatus of claim 4 in which the manifold means further includes a manifold chamber disposed between the fuel pump and each manifold runner.

6. The apparatus of claim 5 in which the valve means includes a metering valve connected to the manifold chamber for metering the pressurized and heated fuel into the manifold chamber in response to the signal from the signal means.

7. The apparatus of claim 5 in which the fuel injector means includes a second metering valve in each manifold runner.

8. The apparatus of claim 7 in which the signal means provides a second signal to the fuel injector means for opening the second metering valve.

9. The apparatus of claim 5 in which the valve means includes a first metering valve in each manifold runner, and the signal generated by the signal means is transmitted to each first metering valve.

* * * * *